United States Patent [19]
Maennle

[11] Patent Number: 5,426,995
[45] Date of Patent: Jun. 27, 1995

[54] POSITION TRANSDUCER

[75] Inventor: Erik Maennle, Oberkirch, Germany

[73] Assignee: Robert Bosch GmbH, Stuttgart, Germany

[21] Appl. No.: 127,030

[22] Filed: Sep. 24, 1993

[30] Foreign Application Priority Data

Dec. 3, 1992 [DE] Germany .................. 42 40 615.3

[51] Int. Cl.$^6$ .................... F16C 1/10; G05G 1/14
[52] U.S. Cl. ......................... 74/506; 74/500.5; 74/502.4; 74/502.6; 74/513; 73/118.1
[58] Field of Search ............... 74/502.4, 500.5, 502.6, 74/506, 513, 470, 501.5 R; 123/399; 73/118.1

[56] References Cited

U.S. PATENT DOCUMENTS

| | | |
|---|---|---|
| 2,616,139 | 11/1952 | VonWald, Jr. et al. ........... 74/501.5 |
| 3,576,302 | 4/1971 | Paifreyman . |
| 4,018,098 | 4/1977 | Beier ............................. 74/470 |
| 4,543,932 | 10/1985 | Sturdy . |
| 4,856,477 | 8/1989 | Hanaoka et al. . |
| 5,020,623 | 6/1991 | Maehara ......................... 74/470 |
| 5,165,298 | 11/1992 | Shier et al. . |

FOREIGN PATENT DOCUMENTS

| | | |
|---|---|---|
| 0393974 | 10/1990 | European Pat. Off. . |
| 0536826 | 4/1993 | European Pat. Off. . |
| 2437953 | 4/1980 | France . |
| 2562011 | 10/1985 | France . |
| 3411393 | 10/1985 | Germany . |
| 3411455 | 10/1985 | Germany . |
| 3411456 | 10/1985 | Germany . |
| 89/07706 | 8/1989 | WIPO . |

OTHER PUBLICATIONS

Research Disclosure–Jan. 1993/51 Accelerator Linkage.

Primary Examiner—Charles A. Marmor
Assistant Examiner—Troy Grabow
Attorney, Agent, or Firm—Edwin E. Greigg; Ronald E. Greigg

[57] ABSTRACT

A position transducer in which an external full-load stop of a pedal and a stop inside a housing for a transducer shaft is adapted to one another in such a way as to assure that a maximum allowable adjusting torque acting upon the transducer shaft will not be exceeded. According to the invention, in the transmission chain between a pedal, the actuating member, a transmission member embodied for instance as a Bowden cable, the driver member and the transducer shaft, a prestressed elastic element is integrated, which by way of example is disposed between the Bowden cable and the driver member and is embodied by the compression spring. To attain the prestressing of the compression spring, the driver member is supported on the actuating member. The compression spring prevents an impermissible adjusting torque on the transducer shaft. The position transducer is suitable for installation in motor vehicles, where it is used to convert a pedal position into an electrical adjusting signal.

14 Claims, 3 Drawing Sheets

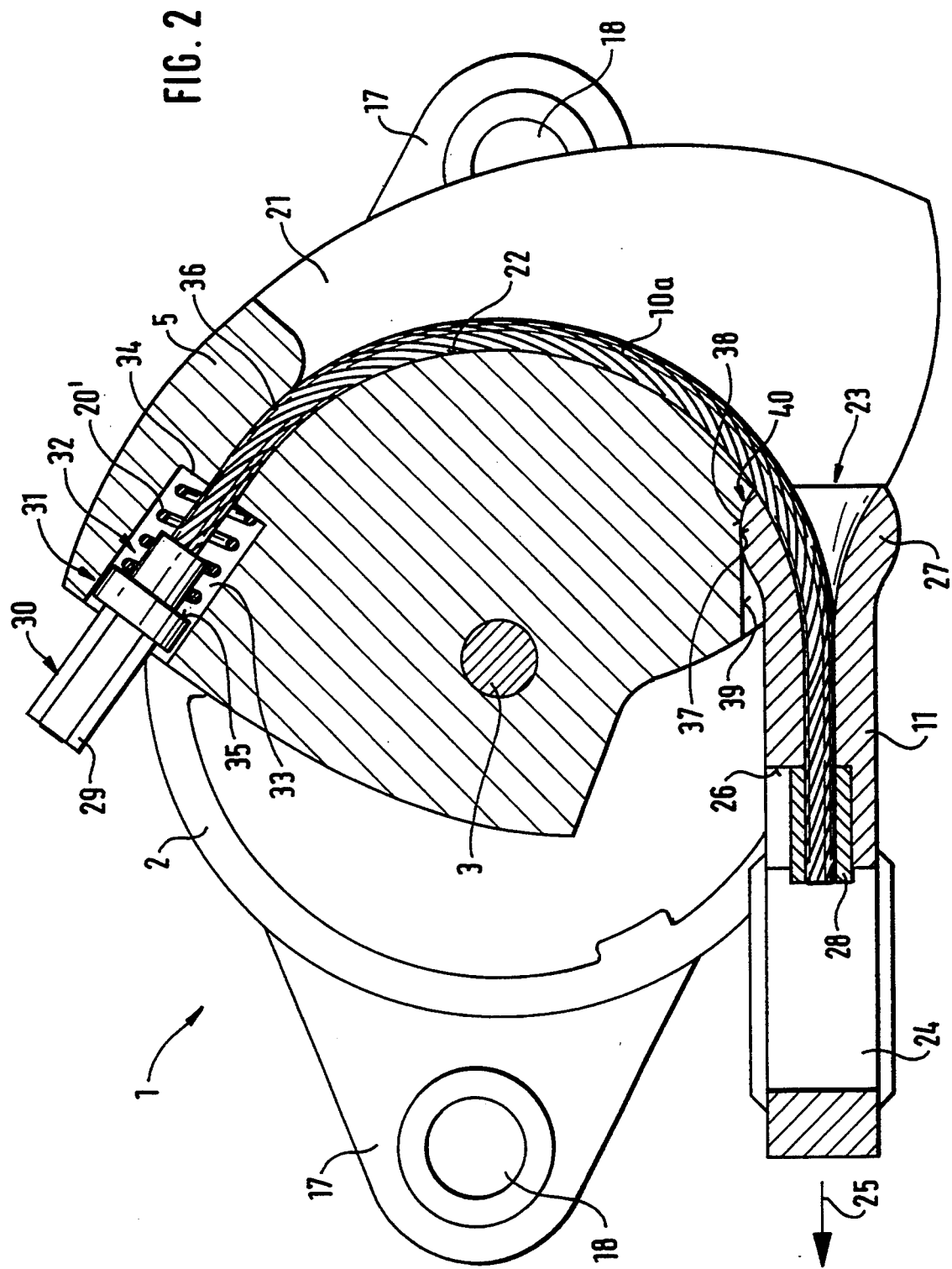

POSITION TRANSDUCER

BACKGROUND OF THE INVENTION

The invention is directed to improvements in position transducers. A position transducer is already known (German Patent Application No. 34 11 456 C2), in which a gas pedal position of a motor vehicle is converted into a rotary position of a transducer shaft, in order by means of a rotary potentiometer to generate an electrical adjusting signal corresponding to the pedal position.

In this kind of position transducer, the transmission of the gas pedal position to the transducer shaft is effected by a tension—or compression-loaded transmission member, which may be embodied as a connecting rod or—in the case of a tensile load—as a Bowden cable. The transmission member is connected on one end to an actuating member that is embodied either by the gas pedal of the motor vehicle itself, or by a further component actuatable by the gas pedal. On its other end, the transmission member is connected to a drive member, which is disposed on the transducer shaft in a manner fixed against relative rotation.

The transducer shaft of the position transducer is acted upon by means of at least one restoring spring with a restoring torque, whose magnitude in terms of amount is dependent on the particular rotary position of the transducer shaft at the time, between an idling position and a full-load position. An adjusting force acting upon the motor vehicle gas pedal is converted into an adjusting torque counteracting the restoring torque, by means of the actuating member, transmission member, and driver member. To avert damage, the transducer shaft upon reaching the full-load position must be prevented from being acted upon by an impermissibly strong adjusting torque, to which a maximum-permissible adjusting force corresponds.

This can be done for instance by making the gas pedal in the full-load position of the transducer shaft come to rest on an external full-load stop connected to the vehicle relative to the gas pedal. A portion of the adjusting force exceeding the maximum allowable adjusting force is then absorbed by the vehicle bottom.

The disadvantage is that for tolerance reasons, an adjustable full-load stop is required, which in an expensive labor step must be adapted to the full-load position of the position transducer after the position transducer has been installed in the vehicle. Moreover, the adjustment of the full-load stop must be checked at regular intervals (for instance on the occasion of an inspection) and readjusted, since if the full-load stop is adjusted incorrectly, damage and even failure of the position transducer are possible.

OBJECT AND SUMMARY OF THE INVENTION

The position transducer of the invention has as its object producing the advantage over the prior art that the requirement for adjustability of the full-load stop of the position transducer as well as its expensive adjustment after installation in the vehicle and checking of the adjustment at regular intervals, is dispensed with, leading to a reduction of the expense for production, installation and maintenance and hence an overall lowering of costs. Moreover, the reliability of the position transducer can be increased, since failure of the position transducer for an incorrect adjustment of the full-load stop is avoided.

It is especially advantageous to embody the elastic element as a compression spring, since its specifications can be defined in a simple manner in order to generate a desired prestressing and a desired deformability.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a section taken along the line II—II of FIG. 1;

DESCRIPTION OF THE PREFERRED EMBODIMENTS

Figure 1:
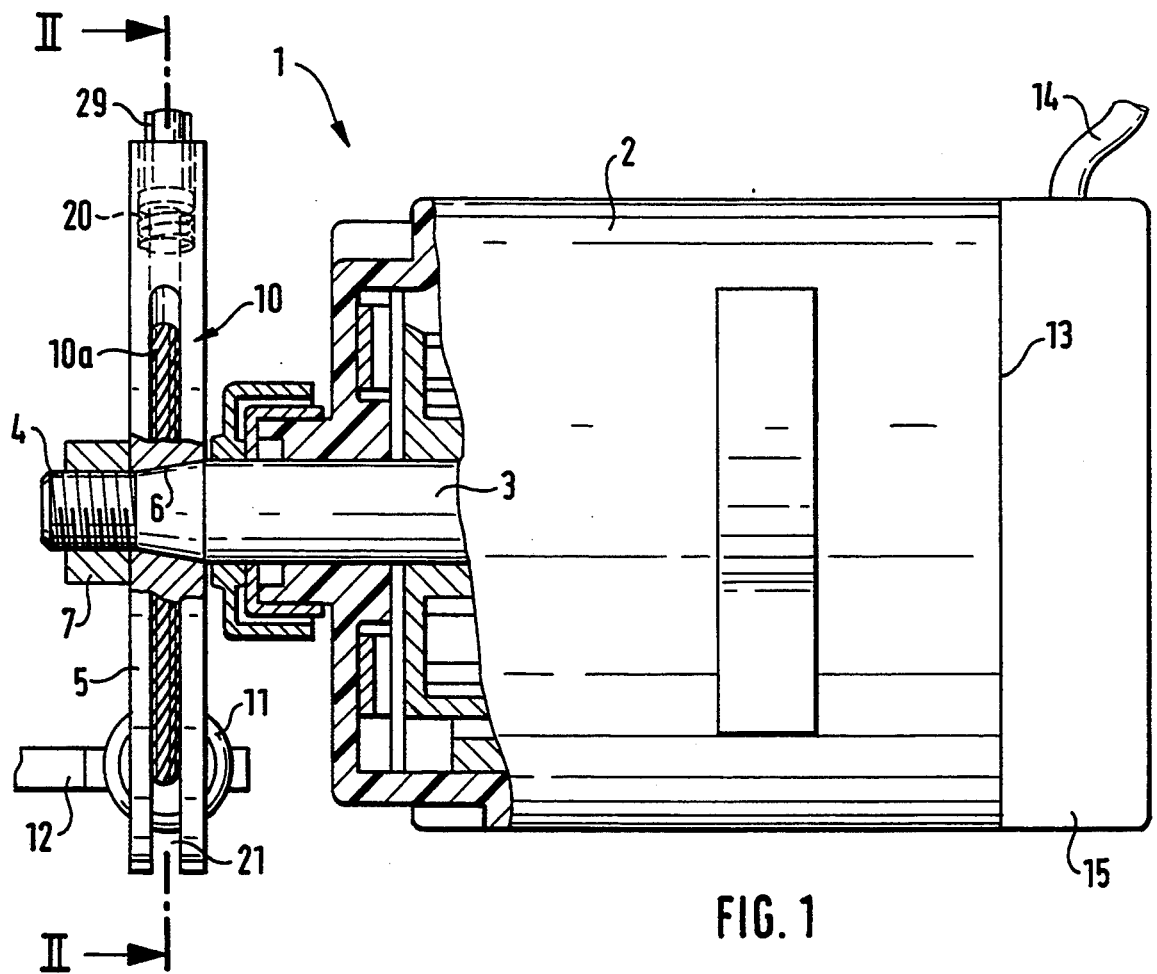
FIG. 1 shows a first exemplary embodiment of a position transducer of the invention.

FIG. 1 shows a position transducer 1 of a motor vehicle that is used to generate an electric adjusting signal. Such a position transducer is equally usable in motor vehicles driven by internal combustion engines and those driven by electric motors, and it is connected to a pedal 12 of the motor vehicle in a known manner. The pedal 12 is put into a desired position by the driver, and this position is detected by the position transducer and converted into an electric adjusting signal corresponding to the pedal position.

The position transducer 1 is embodied as a rotary angle encoder, which has a cylindrical housing in which a transducer shaft 3 is rotatably supported concentrically with the housing 2. A driver member 5 is disposed in a manner fixed against relative rotation on an end 4 of the transducer shaft 3 protruding out of the housing 2. Fastening the driver member 5 to the transducer shaft 3 can be done via a cone seat 6, against which the driver member 5 is pressed by a shaft nut 7. Via a transmission member 10, which in FIG. 1 is embodied by way of example as a Bowden cable 10a, but may also be embodied by a connecting rod, the driver member 5 is connected to an actuating member 11. The actuating member 11 is actuated by the pedal 12, or is embodied by the pedal 12 itself. The actuating member 11 and the transmission member 10 thus form conversion means for converting the pedal position into a rotary angle position of the driver member 5 or transducer shaft 3. The actuating member 11, transmission member 10 and driver member 5 are suitably disposed relative to one another so that an associated rotary angle position of the transducer shaft 3 between an idling position and a full-load position corresponds to any arbitrary pedal position.

The generation of the electrical adjusting signal is done in a known manner by means of a rotary potentiometer 15, which is disposed on the face end 13 of the housing 2 remote from the driver member 5 and is connected to the transducer shaft 3. Via a cable connection 14, the electrical adjustment signal can be carried to an electronic control unit, not shown in the drawing, which controls or regulates the driving power of the motor vehicle in accordance with the electrical adjusting signal.

The transducer shaft 3 is acted upon by a restoring torque, by means of springs disposed in the housing 2, but hidden in FIG. 1 by the housing 2, and by means of this torque, if the pedal 12 is unloaded, the transducer shaft 3 assumes a basic position that is equivalent to the idling position. If an adjusting force is now imposed on the pedal, this adjusting force is at least partly converted by the actuating member 11, the transmission member 10 and the driver member 5, into an adjusting torque acting upon the transducer shaft 3 counter to the restoring torque.

With an increasing rotary angle position of the transducer shaft 3, the restoring torque increases, from the idling position in the direction toward the full-load position, so that an increasing adjusting force must be exerted on the pedal if the transducer shaft 3 is to be moved from the idling position into the full-load position. The term "adjusting force" is intended here expressly to mean only that portion of the total force acting upon the pedal 12 that brings about a corresponding adjusting torque at the transducer shaft 3. Additionally operative forces of friction or restoration are not taken into account here. If the restoring torque and adjusting torque match one another in terms of quantity, then the transducer shaft 3 assumes a stationary rotary angle position.

In the full-load position of the transducer shaft 3, the transducer shaft 3 rests on a stop provided inside the housing 2. Since this internal stop cannot be strained arbitrarily severely, the adjusting torque must not exceed a maximum allowable adjusting torque, which is dependent on the embodiment of the position transducer 1 and is equivalent to a maximum allowable adjusting force on the pedal 12. This can be done in a known manner, for instance, by providing that the pedal 12 in the full-load position of the transducer shaft 3 rests on an external full-load stop connected to the vehicle relative to the pedal, so that any portion of the adjusting force exceeding the maximum allowable adjusting force is diverted via the external full-load stop and does not strain the transducer shaft 3 or the internal stop. To assure that the pedal 12 will rest on the external full-load stop before the maximum allowable adjusting torque on the transducer shaft 3 is exceeded, the invention proposes disposing an elastic element 20 between the transmission member 10 and the driver member 5; in FIG. 1, this elastic element is shown in dashed lines, and it will be described in detail below in conjunction with FIG. 2. The embodiment of the position transducer 1 may be such that the external full-load stop may be dispensed with, and then the vehicle bottom structure can serve as the full-load stop for the pedal 12.

In FIG. 2, the cylindrical shape of the housing 2 of the position transducer 1 can be seen. Fastening straps 17 are disposed facing one another on the circumference of the housing 2, and they have through holes 18 for fastening the position transducer 1 to the vehicle. The driver member 5, shaped as a portion of a disk, is disposed on the transducer shaft 3 in a manner fixed against relative rotation.

Along a portion of the circumference of the driver member 5, a groove 21 is provided, whose bottom face 22 extends predominantly with a constant radial spacing from the transducer shaft 3. The Bowden cable 10a is disposed in the groove 21, resting on the bottom face 22, and it transmits the adjusting motion of the actuating member 11 to the driver member 5. A portion 23 of the actuating member 11 protrudes into the groove 21.

A through opening 24, which serves the purpose of connecting the gas pedal 12 suggested in FIG. 1, the connection being effected for instance by means of a bolt, is located in the actuating member 11, and this bolt adjusts the actuating member 11, for instance in the direction of an arrow 25. A connection 27 in which the Bowden cable 10a extends is provided in the actuating member 11, in a central extension of the groove 21 between the through bore 24 and the portion 23. A fastening sleeve 28 is pressed onto the end of the Bowden cable 10a located in the vicinity of the through bore 24; the outside diameter of the fastening sleeve is greater than the opening diameter of the connection 27, and the sleeve rests on a bearing face 26 of the actuating member 11, so that upon an adjusting motion of the gas pedal 12 (FIG. 1) in the direction of the arrow 25, the Bowden cable 10a is likewise adjusted in the direction of the arrow 25 by means of the actuating member 11.

On the other end of the Bowden cable 10a, remote from the actuating member 11, a clamping sleeve 29 is pressed on that has a clamping region 30, a shoulder region 31, and a guide region 32. The elastic element 20 (FIG. 1), for instance a compression spring 20', is disposed between the clamping sleeve 29 and the driver member 5. The compression spring 20' is at least partly located in a cylindrical receiving opening 33 formed in the driver member 5 and is supported at one end on a bottom face 34 of the receiving opening 33. At the other end, the compression spring 20' is retained on a shoulder face 35 of the shoulder region 31 opposite the bottom face 34. The clamping sleeve 29 is pressed onto the Bowden cable 10a in the clamping region 30. The guide region 32 is disposed inside several windings of the compression spring 20', and this additionally stabilizes the position of the compression spring 20' in the receiving opening 33.

A through bore 36 that connects the receiving bore 33 with the groove 21 is disposed centrally in the bottom face 34, and the Bowden cable 10a protrudes through this bore. Prestressing of the compression spring 20' is defined, among other factors, by the length of the Bowden cable 10a between the fastening sleeve 28 and the shoulder face 35. Because of the rotatability of the driver member 5, and in order to receive this prestressing, the driver member 5 is supported on the actuating member 11 on its side toward the actuating member 11. To that end, the driver member 5 has a first face 37 and the actuating member 11 has a second face 38. The faces 37, 38 are shaped in such a way that the actuating member 11 and driver member 5 can move relative to one another, in the course of which the faces 37 and 38 roll on one another, for instance. The second face 38 may be curved outward in the plane of the drawing of FIG. 2, and the first face 37 may be flat over a first portion 39 and curved inward over a second portion 40, with a radius of curvature matching the curvature of the second face 38. The faces 37, 38 may be either flat or curved parallel to the longitudinal direction of the transducer shaft 3.

The adjusting motion of the actuating member 11 is advantageously effected by the pedal 12 as much as possible in a pivoting plane of the driver member 5, or in a corresponding rotational plane of the transducer shaft 3. If an adequate prestressing force is acting on the compression spring 20', the adjusting motion of the pedal 12 causes a predetermined pivoting motion of the driver member 5 or transducer shaft 3 between the idling and full-load positions, while the outset length and hence the prestressing of the compression spring 20' remain unchanged. If the adjusting force on the actuating member 11 is increased still further after the stop inside the housing for the transducer shaft 3 is reached, then the adjusting torque acting upon the transducer shaft 3 increases as well, until the adjusting force acting in the Bowden cable 10a quantitatively matches the prestressing force of the compression spring 20'. If the adjusting force increases further beyond this, then the compression spring 20' is deformed counter to its prestressing force. The adjusting torque acting upon the transducer shaft 3 then likewise increases still further, but at the same time this effect is associated with a further adjusting motion of the actuating member 11 and hence of the pedal 12. This further adjusting motion is possible until such time as the pedal 12 reaches the aforementioned external full-load stop.

By suitably defining the prestressing force and deformability of the compression spring 20', in such a way that the pedal 12 reaches the external full-load stop before the maximum allowable adjusting force is exceeded, tolerances in terms of adaptation between the external full-load stop and the internal stop can be compensated for. The prestressing force and the deformability of the compression spring 20' should be selected such that between the idling position and the full-load position of the transducer shaft 3 the compression spring 20' remains stiff, which is achieved by a prestressing that is above a normal operating moment of the position transducer 1, and that if this normal operating moment is exceeded in the full-load position of the transducer shaft 3, the compression spring 20', deforms adequately, so that the gas pedal 12 reaches the external full-load stop before the maximum allowable adjusting torque at the transducer shaft 3 is exceeded. The term "normal operating moment" is intended to mean an adjusting torque required, during normal function of the position transducer 1, in order to adjust the transducer shaft 3 between the idling position and the full-load position. It includes any possibly necessary switching moment of a kick-down switch that can additionally be actuated.

Dictated by the prestressing of the compression spring 20', the Bowden cable 10a is also prestressed via the shoulder face 35 of the clamping sleeve 29, so that in any operating position of the position transducer 1 it rests on the bottom face 22 of the groove 21. This has the advantage of preventing undesirable idling play from a loose Bowden cable 10a, in the event that the idling position of the pedal 12 (FIG. 1) and the idling position of the transducer shaft 3 do not match precisely.

Figure 3:
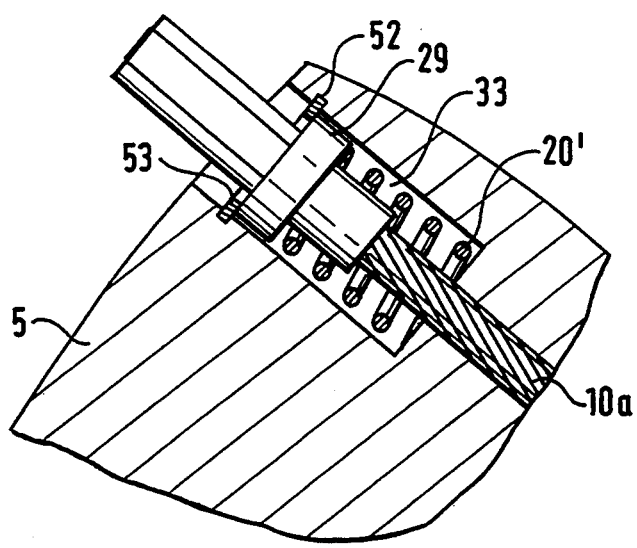
FIG. 3 shows a second exemplary embodiment.

FIG. 3 shows a portion of a second exemplary embodiment of a position transducer 1 according to the invention. Elements that are the same and function the same as in the exemplary embodiments of FIGS. 1 and 2 are identified by the same reference numerals.

In the second exemplary embodiment, the compression spring 20' is prestressed by the clamping sleeve 29, as in the first exemplary embodiment of FIG. 2. To assure the prestressing of the compression spring 20', an annular groove 52 is formed in the wall of the receiving opening 33 of the driver member 5, and a securing ring 53 is disposed in the annular groove; by a side face pointing into the receiving opening 33, this securing ring touches an outwardly facing surface of the clamping sleeve 29 and thus prevents relaxation of the compression spring 20'. Because the securing ring 53 assures the prestressing of the compression spring 20', supporting the driver member 5 on the actuating member 11 as shown in FIG. 2 can then be dispensed with.

Figure 4:
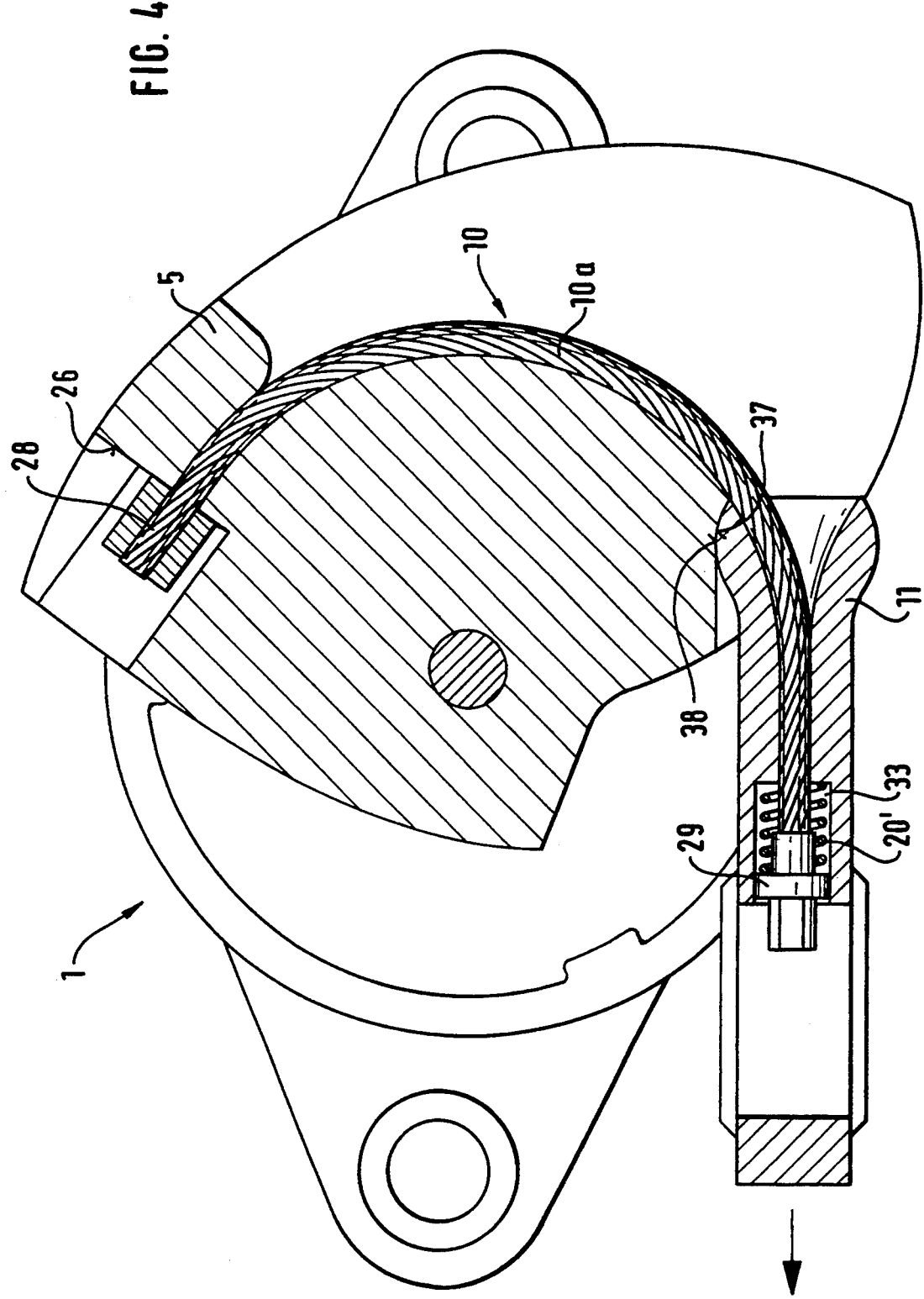
FIG. 4 shows a third exemplary embodiment of a position transducer according to the invention.

FIG. 4 shows a third exemplary embodiment of a position transducer 1 embodied in accordance with the invention; in it, the compression spring 20' is disposed between the actuating member 11 and the transmission member 10. The elements that are the same and function the same as in the exemplary embodiment of FIGS. 1 and 2 and the exemplary embodiment of FIG. 3 are again identified by the same reference numerals.

The essential distinction from the preceding exemplary embodiments is the disposition of the receiving opening 33 in the actuating member 11. The transmission member 10 is again embodied as a Bowden cable 10a and is prestressed via the compression spring 20' by means of the clamping sleeve 29. The fastening sleeve 28 is clamped on the other end of the Bowden cable 10a and rests on the shoulder face 26 embodied on the driver member 5.

The actuating member 11 and the driver member 5 in this exemplary embodiment are again supported on one another via the faces 37, 38 in order to obtain the prestressing of the compression spring 20'. The prestressing of the compression spring 20' can again be assured, analogously to the exemplary embodiment of FIG. 3, by means of the securing ring 53 (shown in FIG. 3), so that the prestressing is obtained even without support of the actuating member 11 on the driver member 5.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A position transducer, having a transducer shaft disposed in a housing and adjustable rotationally between an idling position and a full-load position and resting in the full-load position on a stop located in the housing; a transmission means adjustable in accordance with an adjusting motion of a pedal of a motor vehicle; a driver member (5) is joined to the transducer shaft (3) in a manner fixed against relative rotation and coupled to the pedal by means of the transmission means, the transmission means includes an actuating member (11), and a transmission Bowden cable (10a) connected to the driver member via a prestressed elastic element (20) supported on a clamping sleeve (29) disposed on one end of said transmission cable and the driver member (5), a prestressing force of said elastic element being adapted to an adjusting torque acting upon the transducer shaft (3) to deform the elastic element (20) whenever the transducer shaft (3) rests on the stop located in the housing and the adjusting torque exceeds a previously defined value, said previously defined value being less than a maximum allowable adjusting torque, and the pedal reaches an external full-load stop, dictated by the deformation of the elastic element (20), before the maximum allowable adjusting torque is exceeded.

2. A position transducer as defined by claim 1, in which a groove (21) is embodied in the driver member (5), the groove having a bottom face (22) that extends with an approximately radially constant spacing from the transducer shaft (3) in which said cable (10a) is disposed.

3. A position transducer as defined by claim 1, in which the elastic element (20) is disposed between the actuating member (11) and the transmission member (10).

4. A position transducer as defined by claim 1, in which the elastic element (20) is formed by a compression spring (20′).

5. A position transducer as defined by claim 2, in which the elastic element (20) is formed by a compression spring (20′).

6. A position transducer as defined by claim 3, in which the elastic element (20) is formed by a compression spring (20′).

7. A position transducer as defined by claim 1, in which the actuating member (11) and the driver member (5) support one another.

8. A position transducer as defined by claim 2, in which the actuating member (11) and the driver member (5) support one another.

9. A position transducer as defined by claim 3, in which the actuating member (11) and the driver member (5) support one another.

10. A position transducer as defined by claim 4, in which the actuating member (11) and the driver member (5) support one another.

11. A position transducer as defined by claim 1, in which the clamping sleeve (29) is supported on a securing ring (53).

12. A position transducer as defined by claim 2, in which the clamping sleeve (29) is supported on a securing ring (53).

13. A position transducer as defined by claim 3, in which the clamping sleeve (29) is supported on a securing ring (53).

14. A position transducer as defined by claim 4, in which the clamping sleeve (29) is supported on a securing ring (53).

* * * * *